US010757187B2

(12) United States Patent
Resch et al.

(10) Patent No.: US 10,757,187 B2
(45) Date of Patent: Aug. 25, 2020

(54) STREAMING ALL-OR-NOTHING ENCODING WITH RANDOM OFFSET SUPPORT

(71) Applicant: International Business Machines Corporation, Armonk, NY (US)

(72) Inventors: Jason K. Resch, Chicago, IL (US); Wesley B. Leggette, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 227 days.

(21) Appl. No.: 15/823,171

(22) Filed: Nov. 27, 2017

(65) Prior Publication Data
US 2018/0103100 A1 Apr. 12, 2018

Related U.S. Application Data

(63) Continuation-in-part of application No. 15/688,162, filed on Aug. 28, 2017, now Pat. No. 10,389,845.
(Continued)

(51) Int. Cl.
*G06F 11/00* (2006.01)
*H04L 29/08* (2006.01)
(Continued)

(52) U.S. Cl.
CPC ...... *H04L 67/1097* (2013.01); *G06F 11/1076* (2013.01); *H03M 13/611* (2013.01); *H03M 13/616* (2013.01); *H04L 9/08* (2013.01); *H04L 9/085* (2013.01); *H04L 67/1008* (2013.01); *H04L 67/322* (2013.01); *G06F 3/067* (2013.01);
(Continued)

(58) Field of Classification Search
CPC ....... H04L 67/1097; H04L 9/08; G06F 3/067; H03M 13/611; H03M 13/616
See application file for complete search history.

(56) References Cited

U.S. PATENT DOCUMENTS 4,092,732 A  5/1978 Ouchi
5,454,101 A  9/1995 Mackay et al.
(Continued)

OTHER PUBLICATIONS

Chung; An Automatic Data Segmentation Method for 3D Measured Data Points; National Taiwan University; pp. 1-8; 1998.
(Continued)

*Primary Examiner* — Philip Guyton
(74) *Attorney, Agent, or Firm* — Garlick & Markison; Timothy W. Markison; Timothy D. Taylor

(57) ABSTRACT

A method comprises dividing a data segment of a data object into a plurality of data chunks. The method continues with all-or-nothing (AONT) encoding each data chunk of the plurality of data chunks to produce a plurality of sets of AONT encoded data pieces. Note a set of AONT encoded data pieces includes T number of AONT encoded data pieces. The method continues by splitting and rearranging the plurality of sets of AONT encoded data pieces to produce the T number of sets of AONT encoded data pieces. The method continues by dispersed storage error encoding the T number of sets of AONT encoded data pieces to produce a set of encoded data slices, which include the T number+an R number of encoded data slices.

18 Claims, 8 Drawing Sheets

Related U.S. Application Data which is a continuation-in-part of application No. 14/153,319, filed on Jan. 13, 2014, now Pat. No. 9,774,678, which is a continuation-in-part of application No. 12/838,407, filed on Jul. 16, 2010, now Pat. No. 9,015,431.

(60) Provisional application No. 61/769,588, filed on Feb. 26, 2013, provisional application No. 61/256,226, filed on Oct. 29, 2009.

(51) Int. Cl.

| | |
|---|---|
| H04L 9/08 | (2006.01) |
| H03M 13/00 | (2006.01) |
| G06F 11/10 | (2006.01) |
| G06F 3/06 | (2006.01) |
| H04L 12/859 | (2013.01) |
| H03M 13/15 | (2006.01) |

(52) U.S. Cl.
CPC ..... *H03M 13/1515* (2013.01); *H04L 47/2475* (2013.01); *H04L 67/06* (2013.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 8,327,141 | B2 | 12/2012 | Vysogorets et al. |
| 9,292,700 | B2 * | 3/2016 | Parker ................. G06F 21/606 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2010/0228906 | A1 | 9/2010 | Ramiya Mothilal et al. |
| 2010/0268966 | A1 * | 10/2010 | Leggette ............. G06F 21/6227 713/193 |
| 2010/0299313 | A1 * | 11/2010 | Orsini ..................... H04L 9/085 707/652 |
| 2011/0107036 | A1 | 5/2011 | Resch et al. |
| 2011/0107112 | A1 * | 5/2011 | Resch ................. G06F 11/1004 713/193 |
| 2011/0182424 | A1 * | 7/2011 | Grube ............... H04W 12/0013 380/43 |
| 2011/0246766 | A1 * | 10/2011 | Orsini ................. G06F 11/1076 713/160 |
| 2012/0166576 | A1 * | 6/2012 | Orsini ................. G06F 11/1471 709/217 |
| 2012/0254562 | A1 | 10/2012 | Morrison et al. |
| 2018/0351731 | A1 * | 12/2018 | Karame ................ H04L 9/0637 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

(56) References Cited

OTHER PUBLICATIONS

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

\* cited by examiner

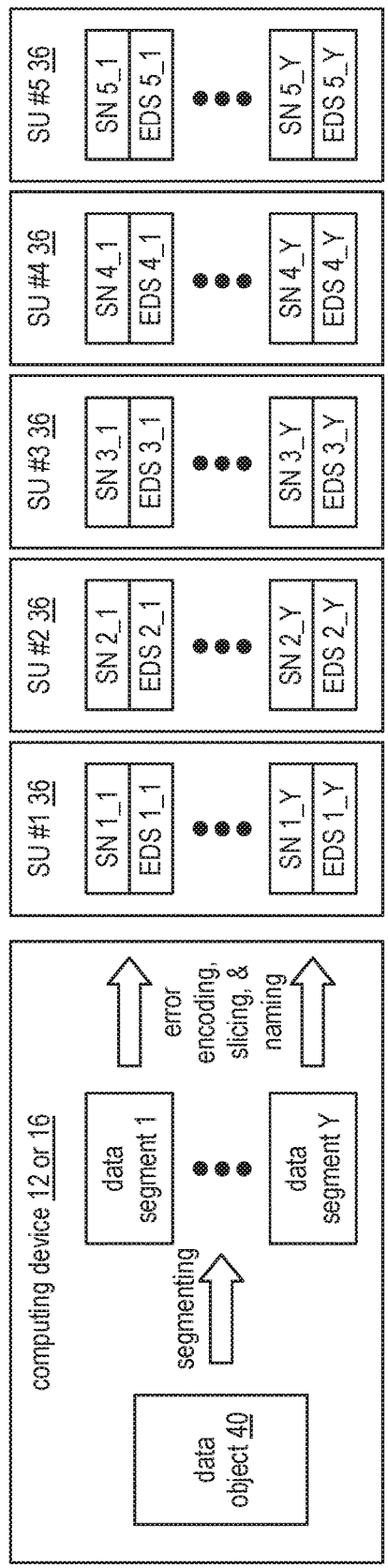
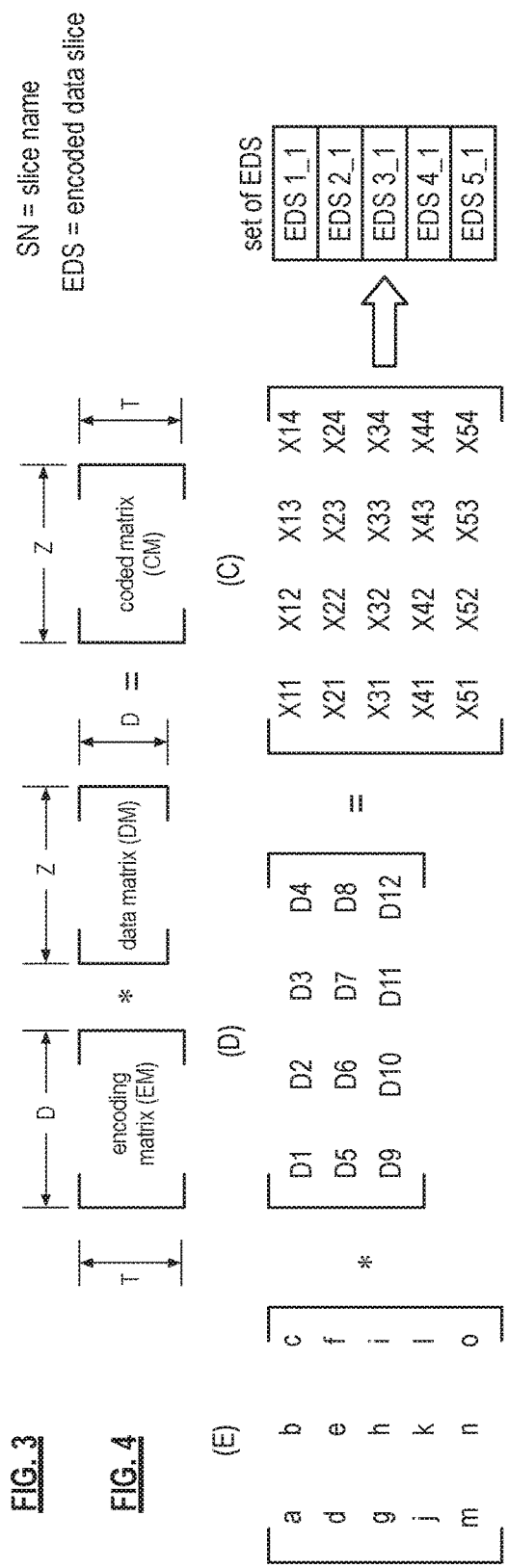
FIG. 3
FIG. 4
FIG. 5
FIG. 6

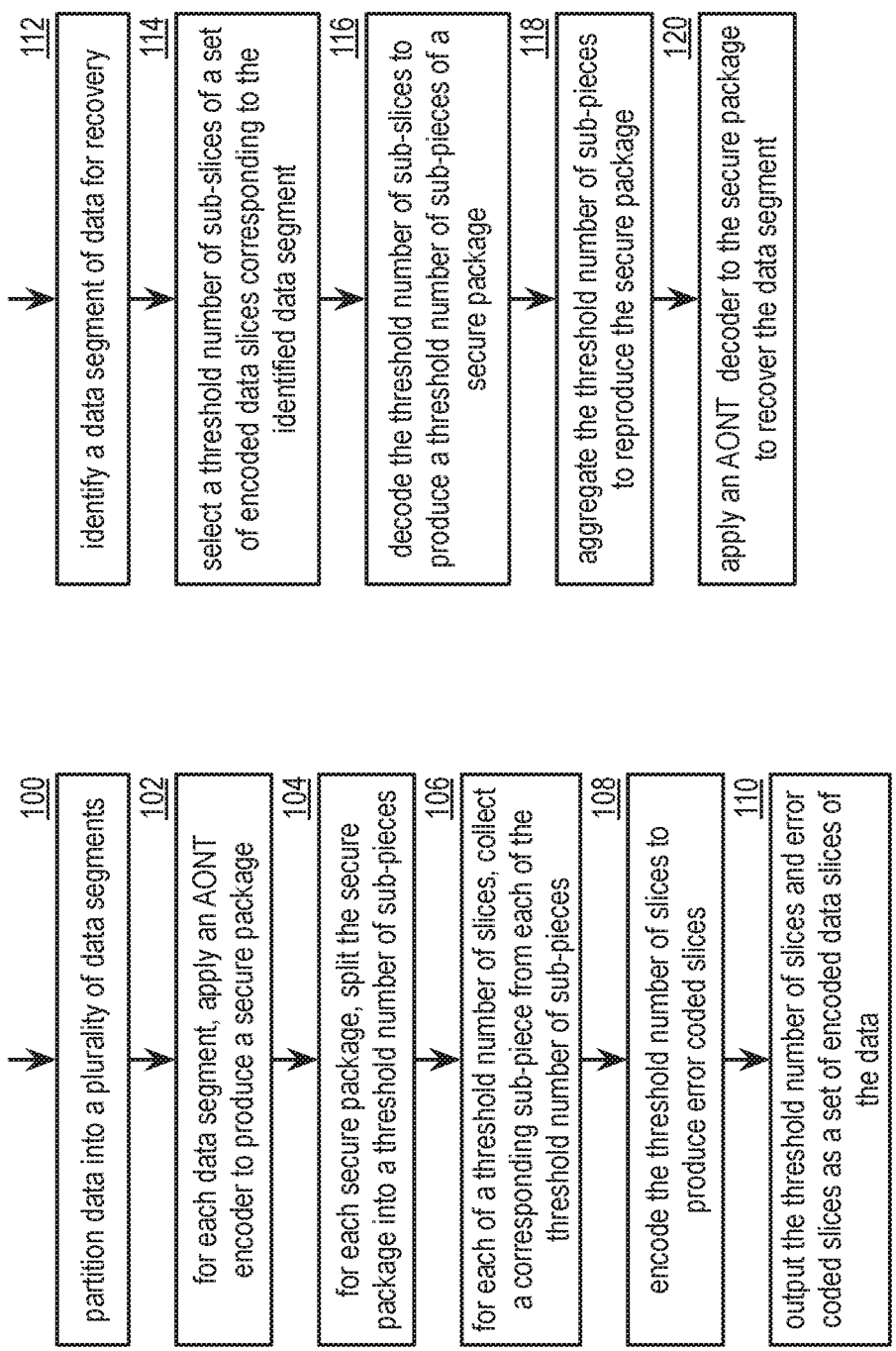

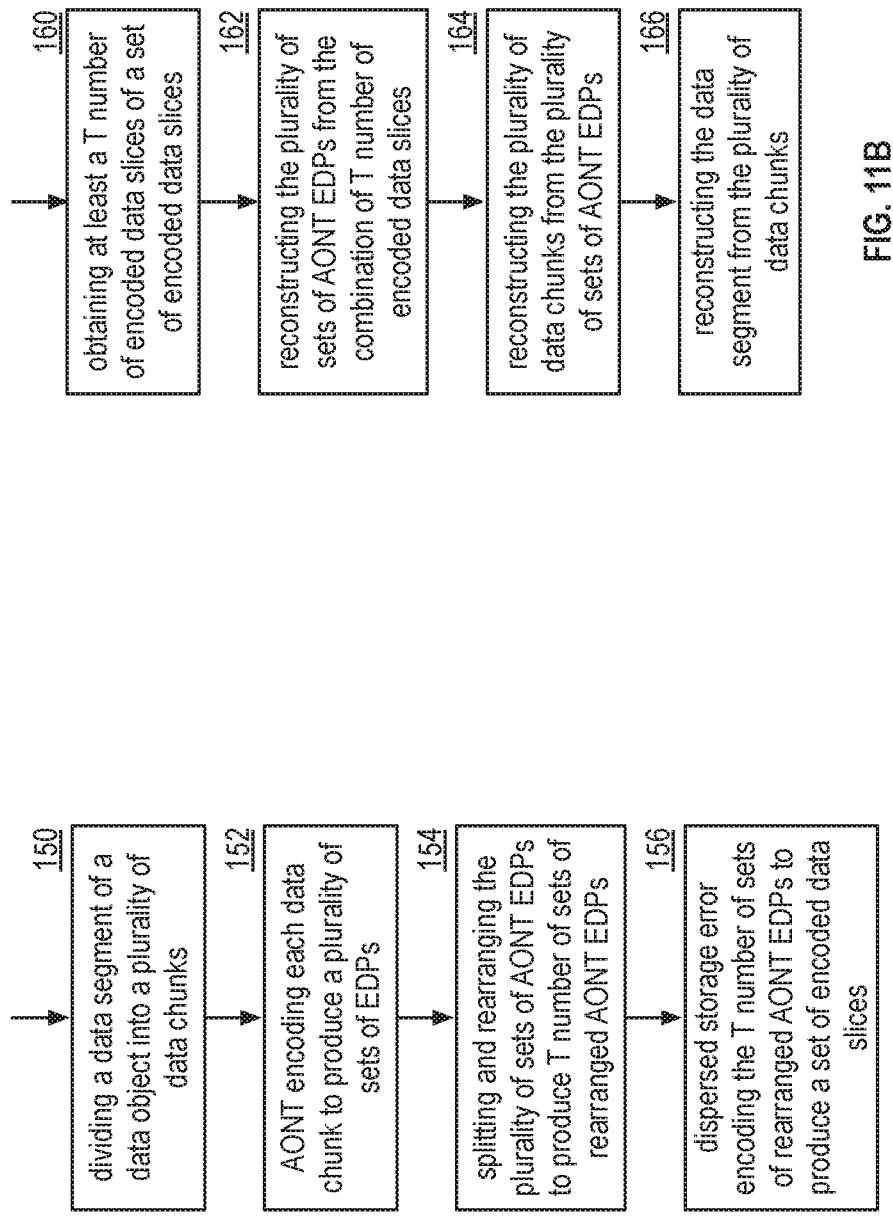

US 10,757,187 B2

STREAMING ALL-OR-NOTHING ENCODING WITH RANDOM OFFSET SUPPORT

CROSS-REFERENCE TO RELATED APPLICATIONS

The present U.S. Utility patent application claims priority pursuant to 35 U.S.C. § 120 as a continuation-in-part of U.S. Utility application Ser. No. 15/688,162, entitled "DETERMINING HOW TO SERVICE REQUESTS BASED ON SEVERAL INDICATORS", filed Aug. 28, 2017, which claims priority as a continuation-in-part of U.S. Utility application Ser. No. 14/153,319, entitled "TEMPORARILY STORING DATA IN A DISPERSED STORAGE NETWORK", filed Jan. 13, 2014, now as issued U.S. Pat. No. 9,774,678, which claims priority pursuant to 35 U.S.C. § 119(e) to U.S. Provisional Application No. 61/769,588, entitled "CONFIRMING INTEGRITY OF DATA IN A DISPERSED STORAGE NETWORK", filed Feb. 26, 2013, now expired, all of which are hereby incorporated herein by reference in their entirety and made part of the present U.S. Utility patent application for all purposes.

U.S. Utility application Ser. No. 14/153,319 also claims priority pursuant to 35 U.S.C. § 120 as a continuation-in-part of U.S. Utility application Ser. No. 12/838,407, entitled "DISTRIBUTED STORAGE REVISION ROLLBACKS", filed Jul. 16, 2010, now as issued U.S. Pat. No. 9,015,431, which claims priority pursuant to 35 U.S.C. § 119(e) to U.S. Provisional Application No. 61/256,226, entitled "DISTRIBUTED STORAGE NETWORK DATA REVISION CONTROL", filed Oct. 29, 2009, now expired, both of which are hereby incorporated herein by reference in their entirety and made part of the present U.S. Utility patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 9C is a flowchart illustrating an example of storing data in accordance with the present invention;

FIG. 9D is a flowchart illustrating an example of retrieving data in accordance with the present invention;

FIG. 11A is a flowchart illustrating an example of a method of all or nothing encoding and dispersed storage error encoding a data chunk in accordance with the present invention; and FIG. 11B is a flowchart illustrating an example of a method of reconstructing a data segment in accordance with the present invention.

DETAILED DESCRIPTION OF THE INVENTION

Figure 1:
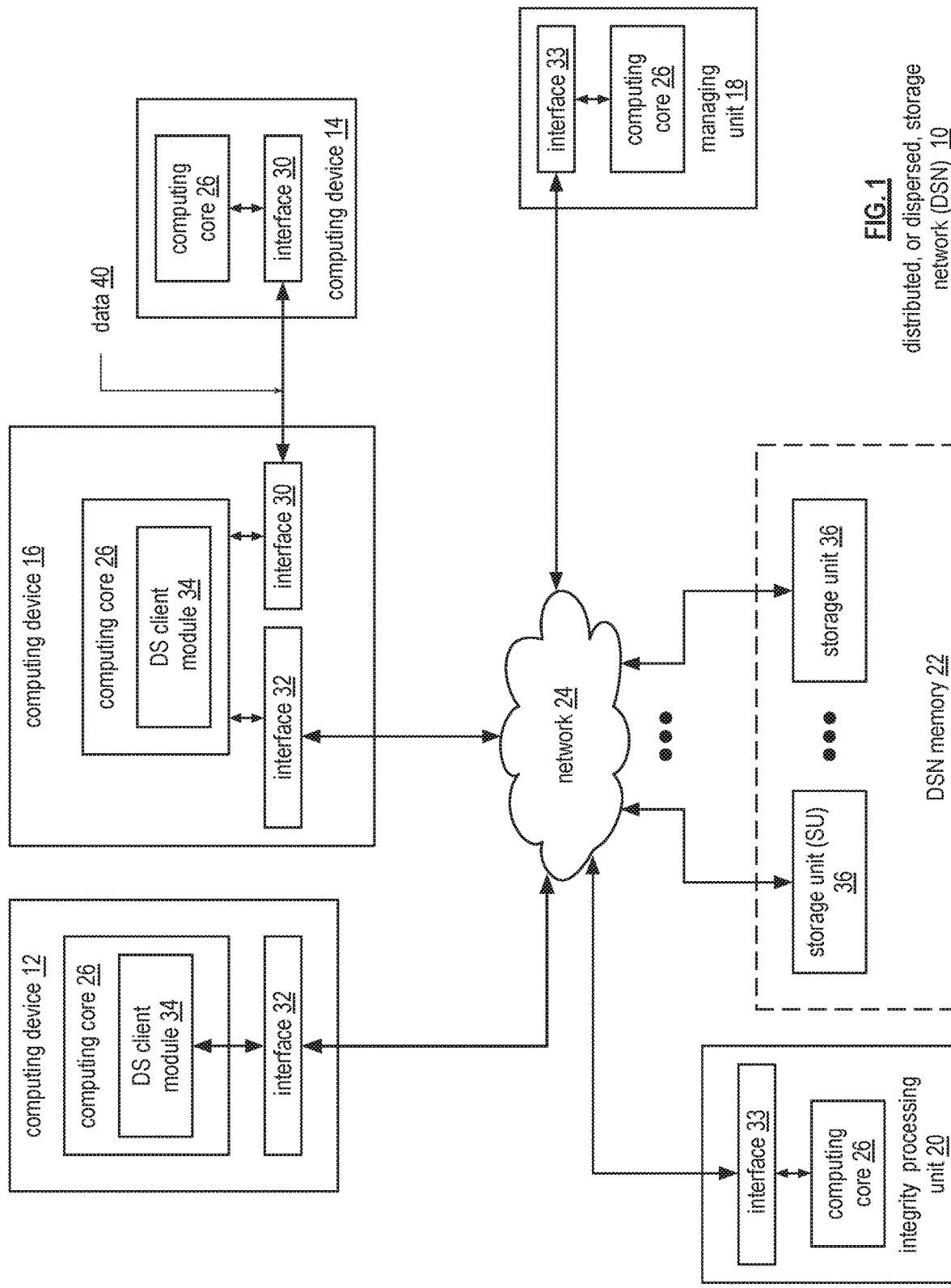
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
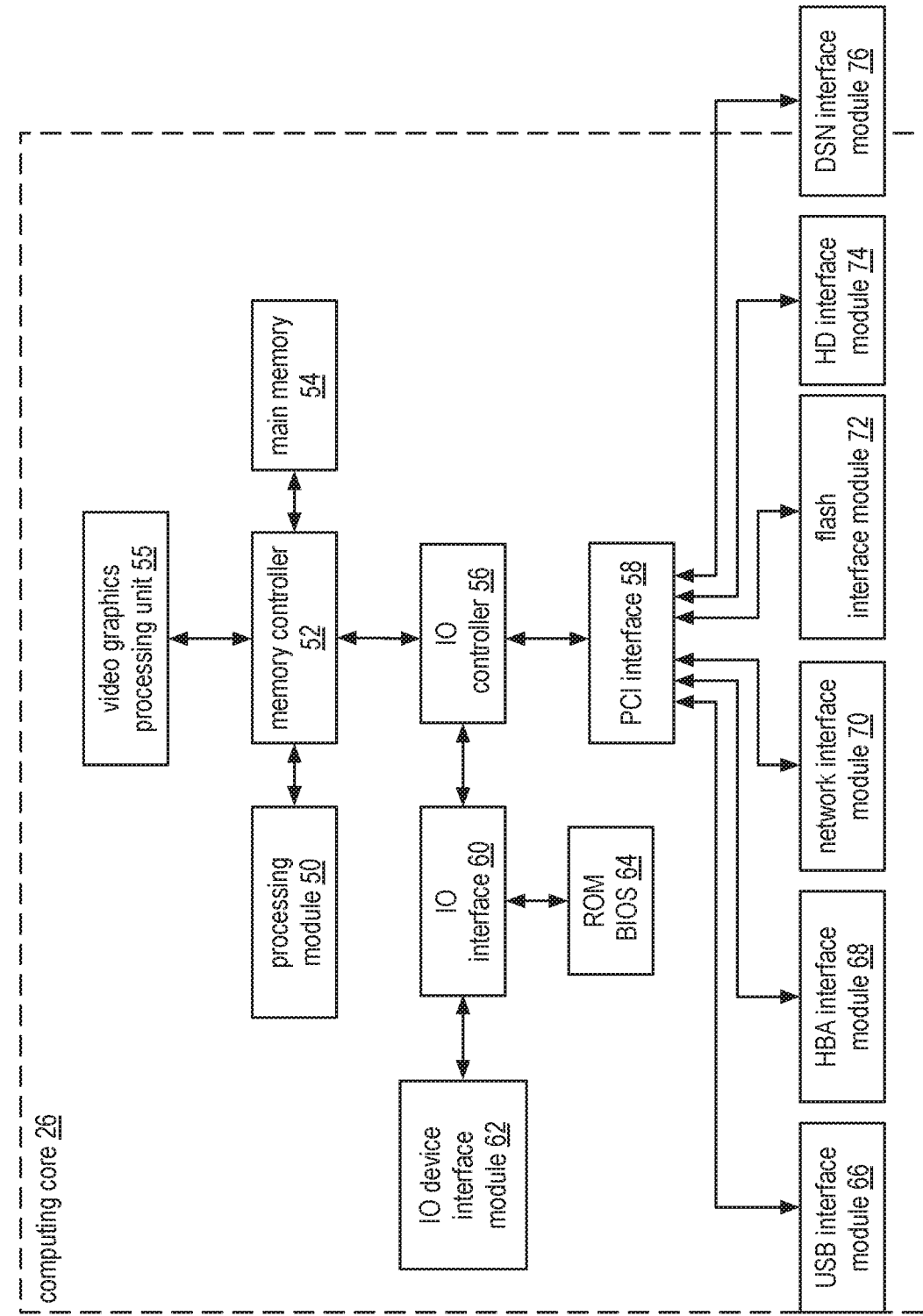
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data (e.g., data 40) on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
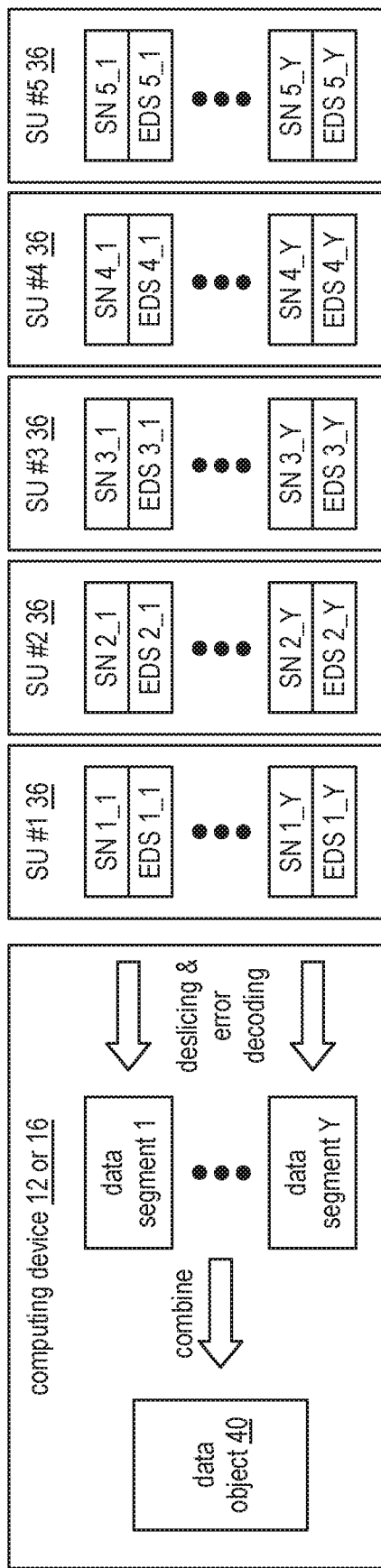
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
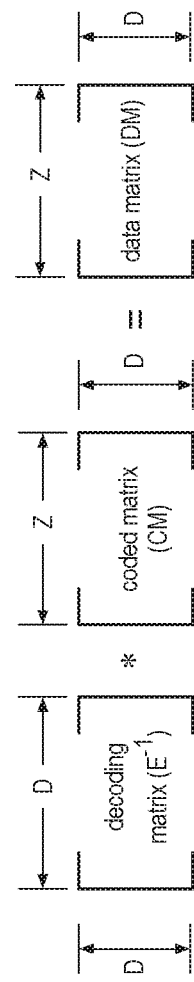
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
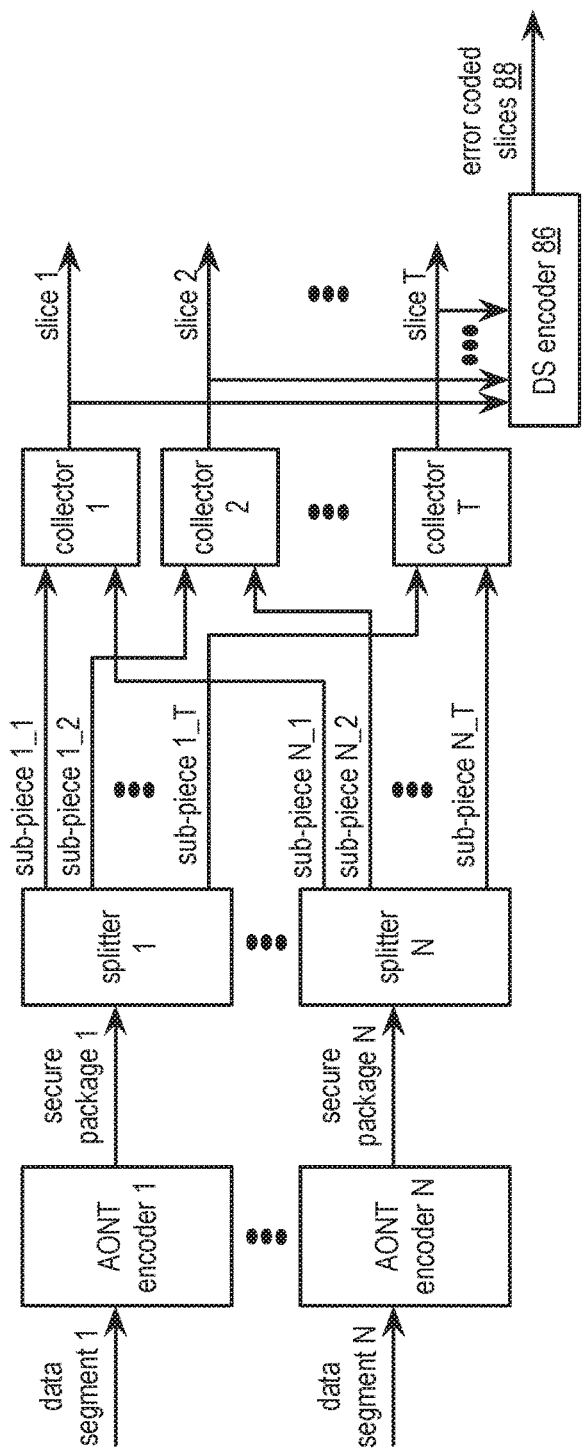
FIG. 9A is a schematic block diagram of an embodiment of a data encoding system in accordance with the present invention.

FIG. 9A is a schematic block diagram of an embodiment of a data encoding system that includes all or nothing (AONT) encoders 1-N, splitters 1-N, collectors 1-T, and a dispersed storage (DS) encoder 86. The system functions to encode data that has been partitioned into data segments 1-N to produce a set of slices. The set of slices may be produced for one or more of storage in a dispersed storage network (DSN), storage in a local memory of a computing device associated with the encoding system, and communication via a communication path to a receiving entity. The encoding of the data is generally in accordance with a dispersed storage error coding function that includes a decode threshold parameter and a pillar width parameter. The set of slices includes a pillar width number of slices. The system encodes the data to produce the pillar width number of slices of the set of slices to include a decode threshold number of slices 1-T and the pillar width minus the decode threshold number of error coded slices.

Each AONT encoder of the AONT encoders 1-N performs an AONT function on a corresponding data segment of data segments 1-N to produce a corresponding secure package of secure packages 1-N. The AONT function includes generating a corresponding random key, encrypting the corresponding data segment using the corresponding random key to produce a corresponding encrypted data segment, performing a deterministic function (e.g., hashing function, cyclic redundancy code function, mask generating function, hash based message authentication code function) on the corresponding encrypted data segment to produce a corresponding digest, masking (e.g., applying an exclusive OR function) the corresponding random key using the corresponding digest to produce a corresponding masked key, and combining (e.g., appending, interleaving, etc.) the corresponding encrypted data and the corresponding masked key to produce the corresponding secure package.

Each splitter of the splitters 1-N splits the corresponding secure package into T sub-pieces associated with the corresponding data segment number, where T is substantially the same as the decode threshold number parameter and each of the T sub-pieces are substantially the same in size. For example, splitter 1 splits secure package 1 to produce sub-piece 1_1 through sub-piece 1_T. Each collector of the collectors 1-T collects like numbered sub-pieces from splitters 1-N. For example, collector 2 collects sub-piece 1_2 associated with data segment 1, collects sub-piece 2_2 associated with data segment 2, collects sub-piece 3_2 associated with data segment 3, etc. through collecting sub-piece N_2 associated with data segment N. Each collector of collectors 1-T aggregates corresponding collected sub-pieces in order by data segment number to produce a corresponding slice of slices 1-T. For example, collector 2 orders sub-piece 1_2, sub-piece 2_2, sub-piece 3_2, through sub-piece N_2 to produce slice 2 of slices 1-T.

The DS encoder 86 aggregates the slices 1-T to produce a slice aggregation and encodes the slice aggregation using the dispersed storage error coding function to produce the pillar width number minus the decode threshold number of error coded slices 88. For example, the set of slices includes 16 slices when the decode threshold T is 10 and the pillar width is 16. The DS encoder encodes the 10 slices 1-T to produce 6 error coded slices (e.g., slices 11-16 of the set of slices 1-16).

The data encoding system enables random access to recover a desired data segment of data segments 1-N. The random access includes accessing a decode threshold number T of sub-slices at a corresponding offset (e.g., from 1 to N) within each of the T slices to produce a decode threshold number of sub-slices, decoding the decode threshold number of sub-slices using the dispersed storage error coding function to reproduce a corresponding secure package, and applying an AONT decoder to decode the corresponding secure package to produce the corresponding desired data segment. For example, when each secure package is 4 KB, and T=16, the 4 KB blocks will correspond to 4096/16=256 byte sub-slices. To read the second data segment requires reading the second sub-slice (of N sub-piece sets) of 256 bytes from any T of the pillar width number of slices (e.g., reading bytes 256-511 of each of the T slices. A data decoding system is described in greater detail with reference to FIG. 9B.

Figure 9B:
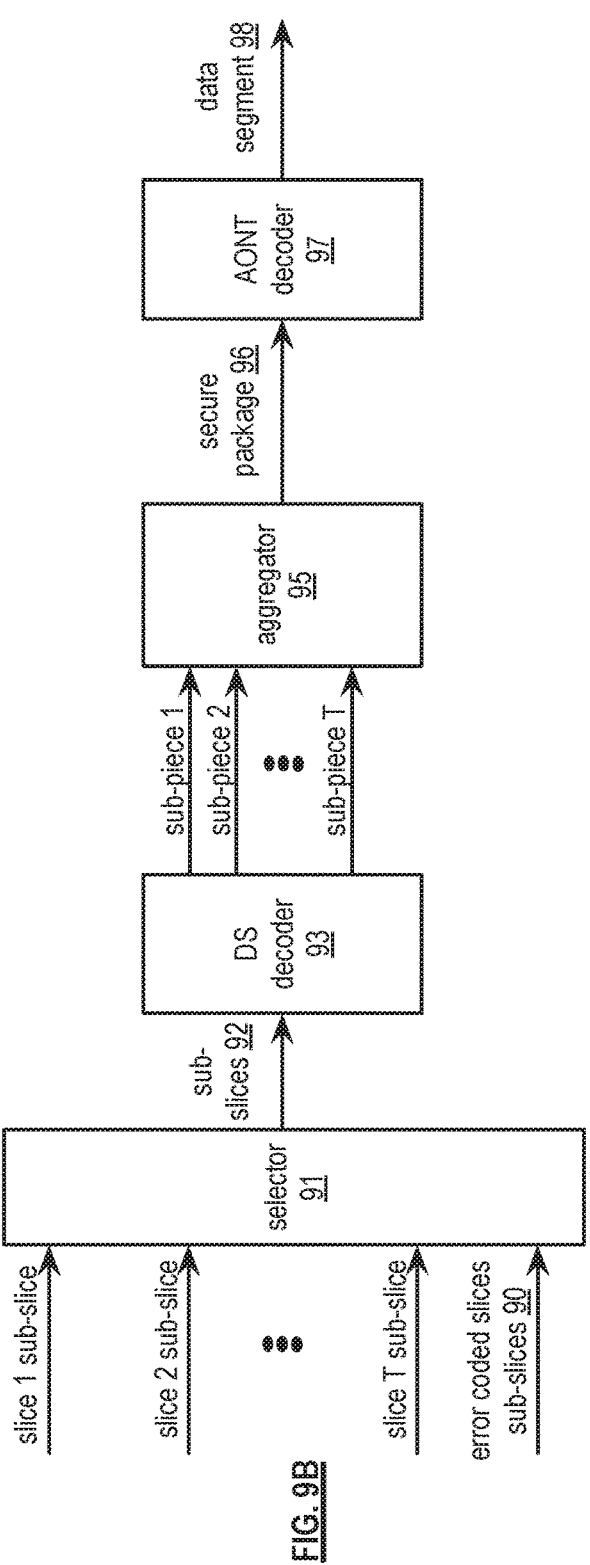
FIG. 9B is a schematic block diagram of an embodiment of a data decoding system

FIG. 9B is a schematic block diagram of an embodiment of a data decoding system that includes a selector 91, a dispersed storage (DS) decoder 93, an aggregator 95, and an all or nothing (AONT) decoder 97. The system functions to provide random access to a desired data segment 98 of N data segments encoded as a set of slices that includes a pillar width number of slices (e.g., as described in FIG. 9A). Each slice of the pillar width number of slices includes N number of sub-slices. The selector 91 accesses at least a decode threshold number T slices of the pillar width number of slices to acquire a decode threshold number of sub-slices corresponding to the desired data segment, where the decode threshold number of sub-slices are acquired at a common offset within each of the decode threshold number of slices in accordance with the desired data segment. The selector has access to a slice 1 sub-slice, a slice 2 sub-slice, through a slice T sub-slice, and error coded slices sub-slices 90. For example, a decode threshold number of sub-slices at a tenth offset within each of the corresponding decode threshold number of slices are acquired when the tenth data segment of the N data segments is the desired data segment.

The DS decoder 93 decodes the decode threshold number of sub-slices 92 using a dispersed storage error coding function to produce T number of sub-pieces 1-T of a corresponding secure package of the desired data segment. The aggregator 95 aggregates ordered sub-pieces 1-T to recover the corresponding secure package 96. The AONT decoder 97 decodes the corresponding secure package 96 using an AONT function to recover the desired data segment 98. The AONT function includes extracting (e.g., de-interleave, de-append, etc.) a masked key and encrypted data from the corresponding secure package, performing a deterministic function on the encrypted data to produce a corresponding digest, de-masking (e.g., applying an exclusive OR function) the masked key using the corresponding digest to produce a corresponding key, and decrypting the encrypted data using the corresponding key to recover the desire data segment 98.

FIG. 9C is a flowchart illustrating an example of storing data. The method begins at step 100 where a processing module (e.g., of a dispersed storage processing module) partitions the data into a plurality of data segments in accordance with a data segmentation scheme. The data segmentation scheme may be based on a desired subsequent random access of one data segment of the plurality of data segments (e.g., aligning data segment size with a desired recoverable data size). For each data segment of the plurality of data segments, the method continues at step 102 where the processing module applies an all or nothing (AONT) encoder to produce a secure package. For each secure package, the method continues at step 104 where the processing module splits the secure package into a threshold number of sub-pieces. For example, the processing module partitions the secure package into a decode threshold number of sub-pieces, where each sub-piece is substantially the same size.

For each of a threshold number of slices of a set of slices, the method continues at step 106 where the processing module collects a corresponding sub-piece from each of the threshold number of sub-pieces. The collection is ordered by sub-piece. The method continues at step 108 where the processing module encodes the threshold number of slices to produce error coded slices. The encoding includes aggregating the threshold number of slices to produce a temporary data segment and encoding the temporary data segment using a dispersed storage error coding function to produce the error coded slices. For example, the processing module utilizes a portion of an encoding matrix (e.g., rows beyond a first decode threshold number of rows) when multiplying a data matrix of the temporary data segment by an encoding matrix to produce a slice matrix that includes only the error coded slices. The method continues at step 110 where the processing module outputs the threshold number of slices and the error coded slices as a set of encoded data slices of the data.

FIG. 9D is a flowchart illustrating an example of retrieving data. The method begins at step 112 where a processing module (e.g., of a dispersed storage processing module) identifies a data segment of data for recovery. The identifying includes at least one of receiving a segment number, receiving an offset, and mapping the offset into a segment number. The method continues at step 114 where the processing module selects a threshold number of sub-slices of a set of encoded data slices corresponding to the identified data segment. The selecting includes identifying a slice offset to select the threshold number of sub-slices based on segment size divided by the threshold number. The method continues at step 116 where the processing module decodes the threshold number of sub-slices to produce a threshold number of sub-pieces of a secure package. The method continues at step 118 where the processing module aggregates the threshold number of sub-pieces to reproduce the secure package. The aggregating includes ordering the threshold number of sub-pieces. The method continues at step 120 where the processing module applies an all or nothing (AONT) decoder to the secure package to recover the data segment.

Figure 10:
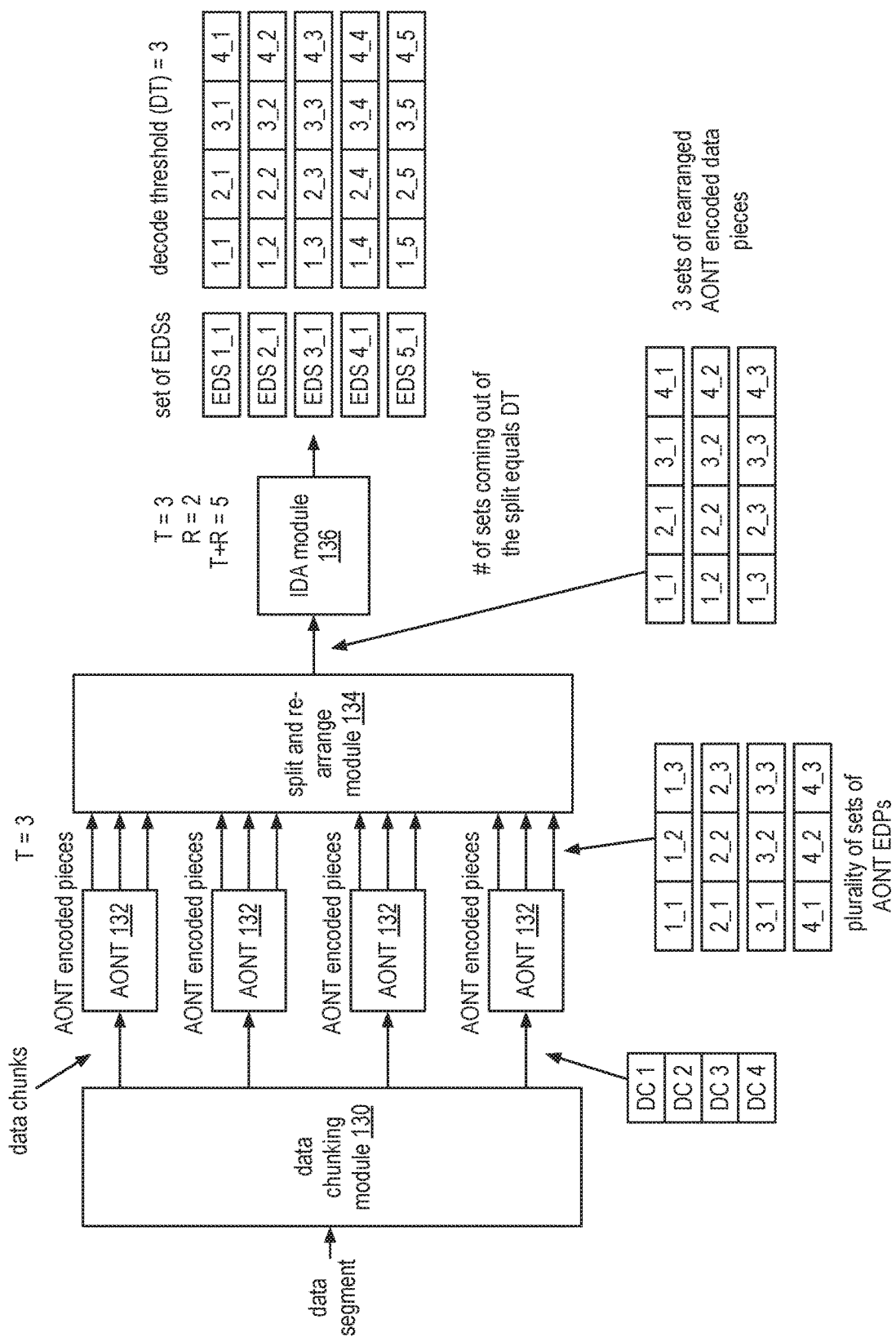
FIG. 10 is a schematic block diagram of another embodiment of a data encoding system in accordance with the present invention.

FIG. 10 is a schematic block diagram of another embodiment of a data encoding system that includes data chunking module 130, all or nothing transform (AONT) encoding modules 132, split and re-arrange module 134, and an information dispersal algorithm (IDA) module 136. The data encoding system allows seeking and reading of a random position of a dispersed data source without recovering the entirety of the dispersed data. For example, a single data chunk of four kilobytes (KB) may be read out of a dispersed one megabyte (MB) segment while only downloading four kilobytes.

In an example of operation, the data chunking module 130 obtains a 16 KB data segment and divides the data segment into four 4 KB data chunks (e.g., data chunk (DC) 1-4). Each AONT encoding module 132 performs an AONT function on a corresponding data chunk to produce a set of all or nothing transform encoded data pieces (AONT EDPs). For example, a first data chunk (e.g., DC 1) of the data chunks is provided to a first AONT encoding module 132, which produces a first set of the AONT encoded data pieces. Note that each set of AONT EDPs includes a T number of pieces, where T corresponds to the decode threshold number of the dispersed storage error encoding function performed by the IDA module 136. Further note that without at least the T number of pieces, no information of a data chunk may be obtained.

The split and re-arrange module 134 uses a splitting and re-arranging algorithm to split and re-arrange the plurality of sets of AONT EDPs into T number of sets of rearranged AONT encoded data pieces (e.g., 3). For example, to create the first set of rearranged AONT encoded data pieces, which is to include pieces 1_1-4_1, the split and rearrange module splits and arranges the fours of sets of AONT EDPs into three sets of rearranged AONT encoded data pieces. For example, a first AONT EDP (1_1) of the first set of AONT EDPs (1_1-1_3), a first AONT EDP (2_1) of the second set AONT EDPs (2_1-2_3), a first AONT EDP (3_1) of the third set AONT EDPs (3_1-3_3) and a first AONT EDP (4_1) of a fourth set of AONT EDPs (4_1-4_3) is used to create the first set of rearranged AONT encoded data pieces.

The IDA module 136 dispersed storage error encodes the T number of sets of rearranged AONT encoded data pieces to produce a set of encoded data slices (e.g., EDS 1_1-EDS 5_1). The set of encoded data slices includes the T number plus and an R number of encoded data slices. For example, when the T number is 3 and the R number is 2, the set of encoded data slices includes 5 encoded data slices.

To decode the data, any contiguous offset and length may be from any T number (e.g., decode threshold) of encoded data slices as long as the offset and length includes the boundaries of a set of AONT EDPs (e.g., within portions 2_1-2_5 of encoded data slices (EDS 1_1-EDS 5_1)). For example, to read the third data chunk, a computing device only needs to read 3 blocks from the third column (e.g., portions 3-1-3_5). Thus, in this example, only 4 KB of data out of a 16 KB data segment may be read to reconstruct the third data chunk.

FIG. 11A is a flowchart illustrating an example of a method of all or nothing encoding and dispersed storage error encoding a data chunk. The method continues with step 150, where a computing device of a dispersed storage network (DSN) divides a data segment of a data object into a plurality of data chunks. The method continues with step 152, where the computing device all-or-nothing (AONT) encodes each data chunk of the plurality of data chunks to produce a plurality of sets of AONT encoded data pieces. Such a set of AONT encoded data pieces includes T number of AONT encoded data pieces.

The method continues with step 154, where the computing device splits and rearranges the plurality of sets of AONT encoded data pieces to produce the T number of sets of rearranged AONT encoded data pieces. For example, the splitting and rearranging includes arranging first encoded data pieces of each set of the plurality of sets of AONT encoded data pieces into a first set of the T number of sets of rearranged AONT encoded data pieces, arranging second encoded data pieces of each set of the plurality of sets of rearranged AONT encoded data pieces into a second set of the T number of sets of AONT encoded data pieces and arranging third encoded data pieces of each set of the plurality of sets of AONT encoded data pieces into a third set of the T number of sets of AONT encoded data pieces.

The method continues with step 156, where the computing device dispersed storage error encodes the T number of sets of AONT encoded data pieces to produce a set of encoded data slices. Note the set of encoded data slices includes the T number+an R number of encoded data slices. Further note a first set of AONT encoded data pieces of the plurality of sets of AONT encoded data can be reconstructed from a first section of each of any combination of T number of encoded data slices of the set of encoded data slices. Still further note that a first data chunk of the plurality of data chunks can be reconstructed from the first set of AONT encoded data pieces.

As an example of the dispersed storage error encoding the T number of sets of AONT encoded data pieces, the computing device generates a data matrix from the T number of sets of AONT encoded data pieces. The computing device then matrix multiplies the data matrix with an encoded matrix to produce a coded matrix. Next, the computing device partitions the coded matrix into the set of encoded data slices.

FIG. 11B is a flowchart illustrating an example of a method of reconstructing a data segment. The method continues with step 160, where a computing device of a plurality of computing devices of a dispersed storage network (DSN) obtains at least T number of encoded data slices of a set of encoded data slices. The method continues with step 162, where the computing device or another computing device of the plurality of computing devices reconstructs the plurality of sets of AONT encoded data pieces from any combination of the T number of encoded data slices of the set of encoded data slices. For example, the computing device matrix multiplies the T number of encoded data slices with a decoding matrix to produce a data matrix that includes the plurality of sets of AONT encoded data pieces. The method continues with step 164, where the computing device or the other computing device reconstructs the plurality of data chunks from the plurality of sets of AONT encoded data pieces. For example, the computing device AONT decodes the plurality of sets of AONT encoded data pieces to produce data chunks. The method continues with step 166, where the computing device or the other computing device reconstructs the data segment from the plurality of data chunks. For example, the computing device combines the data chunks to produce the data segment. Note any of the above methods may be performed by a computer readable storage device that includes a plurality of memory sections that store operational instructions, that when executed by a computing device of the dispersed storage network, cause the computing device to perform the various method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:

dividing, by a computing device of a storage network, a data segment of a data object into a plurality of data chunks;

all-or-nothing (AONT) encoding, by the computing device, each data chunk of the plurality of data chunks to produce a plurality of sets of AONT encoded data pieces, wherein each set of AONT encoded data pieces of the plurality of sets of AONT encoded data pieces includes a T number of AONT encoded data pieces, and wherein the T number corresponds to a minimum number of AONT encoded data pieces needed to reconstruct a data chunk of the plurality of data chunks;

arranging, by the computing device, the plurality of sets of AONT encoded data pieces to produce T number of sets of rearranged AONT encoded data pieces; and dispersed storage error encoding, by the computing device, the T number of sets of rearranged AONT encoded data pieces to produce a set of encoded data slices, wherein the set of encoded data slices includes the T number+an R number of encoded data slices, wherein the T number corresponds to a minimum number of encoded data slices needed to reconstruct the data chunk, wherein a first set of AONT encoded data pieces of the plurality of sets of AONT encoded data pieces can be reconstructed from a first section of any combination of the T number of encoded data slices of the set of encoded data slices, and wherein a first data chunk of the plurality of data chunks can be reconstructed from the first set of AONT encoded data pieces.

2. The method of claim 1 further comprises:
reconstructing, by the computing device or another computing device of the storage network, a second set of AONT encoded data pieces of the plurality of sets of AONT encoded data from a second section of the any combination of T number of encoded data slices of the set of encoded data slices.

3. The method of claim 1 further comprises:
reconstructing, by the computing device or another computing device of the storage network, the plurality of sets of AONT encoded data pieces from the any combination of T number of encoded data slices of the set of encoded data slices;
reconstructing, by the computing device or the other computing device, the plurality of data chunks from the plurality of sets of AONT encoded data pieces; and
reconstructing, by the computing device or the other computing device, the data segment from the plurality of data chunks.

4. The method of claim 1, wherein the dispersed storage error encoding the T number of sets of rearranged AONT encoded data pieces comprises:
generating a data matrix from the T number of sets of rearranged AONT encoded data pieces;
matrix multiplying the data matrix with an encoded matrix to produce a coded matrix; and
partitioning the coded matrix into the set of encoded data slices.

5. The method of claim 1, wherein the arranging comprises:
arranging first encoded data pieces of each set of the plurality of sets of AONT encoded data pieces into a first set of the T number of sets of rearranged AONT encoded data pieces;
arranging second encoded data pieces of each set of the plurality of sets of AONT encoded data pieces into a second set of the T number of sets of rearranged AONT encoded data pieces; and
arranging third encoded data pieces of each set of the plurality of sets of AONT encoded data pieces into a third set of the T number of sets of rearranged AONT encoded data pieces.

6. The method of claim 1 further comprises:
obtaining, by the computing device or another computing device of the storage network, the T number of the first section of any combination of T number of encoded data slices; and
dispersed storage error decoding, by the computing device or the other computing device, the first section of any combination of T number of encoded data slices to produce the first set of AONT encoded data pieces.

7. A computing device of a storage network comprises:
memory;
an interface; and
a processing module, wherein the memory and the interface are operably coupled to the processing module, wherein the processing module is operable to:
divide a data segment of a data object into a plurality of data chunks;
all-or-nothing (AONT) encode each data chunk of the plurality of data chunks to produce a plurality of sets of AONT encoded data pieces, wherein each set of AONT encoded data pieces of the plurality of sets of AONT encoded data pieces includes a T number of AONT encoded data pieces, and wherein the T number corresponds to a minimum number of AONT encoded data pieces needed to reconstruct a data chunk of the plurality of data chunks;
arrange the plurality of sets of AONT encoded data pieces to produce T number of sets of rearranged AONT encoded data pieces; and
dispersed storage error encode the T number of sets of rearranged AONT encoded data pieces to produce a set of encoded data slices, wherein the set of encoded data slices includes the T number+an R number of encoded data slices, wherein the T number corresponds to a minimum number of encoded data slices needed to reconstruct the data chunk, wherein a first set of AONT encoded data pieces of the plurality of sets of AONT encoded data can be reconstructed from a first section of any combination of the T number of encoded data slices of the set of encoded data slices, and wherein a first data chunk of the plurality of data chunks can be reconstructed from the first set of AONT encoded data pieces.

8. The computing device of claim 7, wherein the processing module is further operable to:
reconstruct a second set of AONT encoded data pieces of the plurality of sets of AONT encoded data from a second section of the any combination of T number of encoded data slices of the set of encoded data slices.

9. The computing device of claim 7, wherein the processing module is further operable to:
reconstruct the plurality of sets of AONT encoded data pieces from the any combination of T number of encoded data slices of the set of encoded data slices;
reconstruct the plurality of data chunks from the plurality of sets of AONT encoded data pieces; and
reconstruct the data segment from the plurality of data chunks.

10. The computing device of claim 7, wherein the processing module is operable to perform the dispersed storage error encoding the T number of sets of rearranged AONT encoded data pieces by:
generating a data matrix from the T number of sets of rearranged AONT encoded data pieces;
matrix multiplying the data matrix with an encoded matrix to produce a coded matrix; and
partitioning the coded matrix into the set of encoded data slices.

11. The computing device of claim 7, wherein the processing module is operable to perform the arranging by:
arranging first encoded data pieces of each set of the plurality of sets of rearranged AONT encoded data pieces into a first set of the T number of sets of AONT encoded data pieces;
arranging second encoded data pieces of each set of the plurality of sets of rearranged AONT encoded data pieces into a second set of the T number of sets of AONT encoded data pieces; and
arranging third encoded data pieces of each set of the plurality of sets of rearranged AONT encoded data pieces into a third set of the T number of sets of AONT encoded data pieces.

12. The computing device of claim 7, wherein the processing module is further operable to:
obtain the T number of the first section of each of any combination of T number of encoded data slices; and
dispersed storage error decode the first section of any combination of T number of encoded data slices to produce the first set of AONT encoded data pieces.

13. A computer readable storage device comprises:
at least one memory section that stores operational instructions that, when executed by a computing device of a storage network causes the computing device to:
divide a data segment of a data object into a plurality of data chunks;
all-or-nothing (AONT) encode each data chunk of the plurality of data chunks to produce a plurality of sets of AONT encoded data pieces, wherein each set of AONT encoded data pieces of the plurality of sets of AONT encoded data pieces includes a T number of AONT encoded data pieces, and wherein the T number corresponds to a minimum number of AONT encoded data pieces needed to reconstruct a data chunk of the plurality of data chunks;
arrange the plurality of sets of AONT encoded data pieces to produce T number of sets of rearranged AONT encoded data pieces; and
dispersed storage error encode the T number of sets of rearranged AONT encoded data pieces to produce a set of encoded data slices, wherein the set of encoded data slices includes the T number+an R number of encoded data slices, wherein the T number corresponds to a minimum number of encoded data slices needed to reconstruct the data chunk, wherein a first set of AONT encoded data pieces of the plurality of sets of AONT encoded data can be reconstructed from a first section of any combination of the T number of encoded data slices of the set of encoded data slices, and wherein a first data chunk of the plurality of data chunks can be reconstructed from the first set of AONT encoded data pieces.

14. The computer readable storage device of claim 13, wherein the at least one memory section stores further operational instructions, that when executed by the computing device, cause the computing device to:
reconstruct a second set of AONT encoded data pieces of the plurality of sets of AONT encoded data from a second section of the any combination of T number of encoded data slices of the set of encoded data slices.

15. The computer readable storage device of claim 13, wherein the at least one memory section stores further operational instructions, that when executed by the computing device, cause the computing device to:
reconstruct the plurality of sets of AONT encoded data pieces from the any combination of T number of encoded data slices of the set of encoded data slices;
reconstruct the plurality of data chunks from the plurality of sets of AONT encoded data pieces; and
reconstruct the data segment from the plurality of data chunks.

16. The computer readable storage device of claim 13, wherein the at least one memory section stores further operational instructions that, when executed by the computing device, causes the computing device to perform the dispersed storage error encoding the T number of sets of rearranged AONT encoded data pieces by:
generating a data matrix from the T number of sets of rearranged AONT encoded data pieces;
matrix multiplying the data matrix with an encoded matrix to produce a coded matrix; and
partitioning the coded matrix into the set of encoded data slices.

17. The computer readable storage device of claim 13, wherein the at least one memory section stores further operational instructions that, when executed by the computing device, causes the computing device to perform the arranging by:
arranging first encoded data pieces of each set of the plurality of sets of AONT encoded data pieces into a first set of the T number of sets of rearranged AONT encoded data pieces;
arranging second encoded data pieces of each set of the plurality of sets of AONT encoded data pieces into a second set of the T number of sets of rearranged AONT encoded data pieces; and
arranging third encoded data pieces of each set of the plurality of sets of AONT encoded data pieces into a third set of the T number of sets of rearranged AONT encoded data pieces.

18. The computer readable storage device of claim 13, wherein the at least one memory section stores further operational instructions, that when executed by the computing device, cause the computing device to:
obtain the T number of the first section of each of any combination of T number of encoded data slices; and
dispersed storage error decode the first section of any combination of T number of encoded data slices to produce the first set of AONT encoded data pieces.

* * * * *